(12) United States Patent
Bruneaux

(10) Patent No.: US 10,575,040 B2
(45) Date of Patent: Feb. 25, 2020

(54) DIGITAL SIGNAGE SYSTEM

(71) Applicant: Piksel, Inc., Wilmington, DE (US)

(72) Inventor: Sylvere Bruneaux, Paris (FR)

(73) Assignee: Piksel, Inc., Wilmington, DE (US)

( * ) Notice: Subject to any disclaimer, the term of this patent is extended or adjusted under 35 U.S.C. 154(b) by 0 days.

(21) Appl. No.: 14/673,510

(22) Filed: Mar. 30, 2015

(65) Prior Publication Data

US 2015/0312610 A1    Oct. 29, 2015

(30) Foreign Application Priority Data

Apr. 3, 2014   (EP) .................................... 14305489

(51) Int. Cl.
*H04N 21/81*    (2011.01)
*H04N 21/414*   (2011.01)
*H04N 21/258*   (2011.01)
*H04N 21/2668*  (2011.01)
*H04N 21/2665*  (2011.01)

(52) U.S. Cl.
CPC ... *H04N 21/2668* (2013.01); *H04N 21/25816* (2013.01); *H04N 21/25866* (2013.01); *H04N 21/2665* (2013.01); *H04N 21/41415* (2013.01); *H04N 21/812* (2013.01)

(58) Field of Classification Search
CPC ......... H04N 21/2668; H04N 21/41415; H04N 21/812; G06Q 30/0241
USPC ..................................................... 725/30, 34
See application file for complete search history.

(56) References Cited

U.S. PATENT DOCUMENTS

| 2007/0050372 | A1* | 3/2007 | Boyle | G06Q 30/02 |
| 2008/0033801 | A1* | 2/2008 | McKenna | G06Q 30/02 705/14.4 |
| 2010/0118200 | A1* | 5/2010 | Gelman | G06F 3/041 348/578 |
| 2010/0125881 | A1* | 5/2010 | Douma | H04N 7/173 725/87 |
| 2010/0318430 | A1* | 12/2010 | Rebelo Norte | G06Q 30/0273 705/14.69 |
| 2011/0166925 | A1* | 7/2011 | Khare | G06Q 30/02 705/14.43 |
| 2012/0079578 | A1* | 3/2012 | Dachiraju | H04N 21/2225 726/7 |

(Continued)

*Primary Examiner* — Nasser M Goodarzi
*Assistant Examiner* — Jaycee Imperial
(74) *Attorney, Agent, or Firm* — Hamilton, Brook, Smith & Reynolds, P.C.

(57) ABSTRACT

Digital signage system control is provided by delivering media content from a digital signage system to display devices. A terminal's display of a custom channel producer may be controlled to display media asset options. The selection by the custom channel producer of media assets is detectable based on selection of displayed media asset options of media assets. The selected media assets are stored in a media store external to the system. The media store stores media assets that are deliverable to a viewing device responsive to a viewer's selection of the viewing device. The display parameters of further media asset stored in a media store external to the system may be validated and selected by the custom channel producer to produce a custom channel that includes the selected media assets with further media assets that are dependent on the display parameters. The custom channel is deliverable to the display devices.

18 Claims, 5 Drawing Sheets

(56) References Cited

U.S. PATENT DOCUMENTS

2012/0324511 A1\* 12/2012 Koh ..................... H04H 60/06
725/53

\* cited by examiner

DIGITAL SIGNAGE SYSTEM

RELATED APPLICATION

This application claims priority under 35 U.S.C. § 119 or 365 to Europe, Application No. EP 14305489.8, filed Apr. 3, 2014. The entire teachings of the above application are incorporated herein by reference.

BACKGROUND

Media content can be viewed at display devices in accordance with different content delivery systems.

One example of a content delivery system is a cloud based online video platform (OVP). A customer can upload content to the online video platform via a user interface which enables the content to be delivered to end users across multiple devices. Content can be managed in a media library, and customers can set rules as to where and when their videos can be viewed. Online video platform's also typically support distribution of live video broadcasts. In response to detecting selection by a viewer at a viewing device (e.g. computer, tablet, mobile phone etc.) of a media asset hosted by the online video platform, the online video platform handles the delivery of the media asset to the viewing device.

Another example of a content delivery system is a digital signage system. Digital signage is a form of electronic display that shows information, advertising and other messages on digital "signs" for example on LCD (Liquid Crystal Display), PDP (Plasma Display Panel), OLED (Organic Light Emitting Diode) displays. Digital signage has significant advantages over traditional static signs in that displayed content can be changed readily and is delivered using different mediums, including video, still images, audio and text. Digital signage can be provided according to a software-as-a-service (SaaS) model where content is uploaded to a cloud based digital signage system and delivered in the form of a custom channel to display devices in accordance with display parameters configured by a custom channel producer.

SUMMARY

The inventors have recognised that it can be desirable for a custom channel producer of a digital signage platform to have the ability to search media content from other sources of media content other than that uploaded to storage of the digital signage system (for example the customer may have content stored on an online video platform) and use this media content from other sources in producing a custom channel for delivery to display devices.

Furthermore, the customer may require access to further sources beyond those already authenticated in the digital signage system.

Moving content stored on an online video platform to a digital signage platform may be particularly restrictive due to the typically large size of media assets and the large number of these media assets typically stored on an online video platform.

Access to further party information whom may be an advertiser and that further parties' associated further media assets may also prove problematic.

According to one aspect there is provided a digital signage system comprising a media asset store storing a plurality of media assets associated with a content broadcaster; a communications interface for receiving one or more further media assets of at least one further party from at least one further media store external to said digital signage system; one or more display device(s); a user interface module configured to (i) control a display of a terminal associated with a custom channel producer to display media asset options, (ii) detect selection by the custom channel producer of the plurality of media assets based on detecting selection of displayed media asset options corresponding to the plurality of media assets and said further media assets, (iii) receive display parameters selected by the custom channel producer; and a content stream controller coupled to the communications interface, media asset store and the one or more display device(s), the content stream controller configured to deliver the plurality of media assets and further media assets in a custom channel to the one or more display device(s) in accordance with the display parameters received from the custom channel producer; a validation module configured to receive display parameters for the display of the one or more media assets and further media assets associated with said at least one further party, and supply said display parameters to the content stream controller in response to validating acceptance of said display parameters by the content broadcaster; wherein in response to receiving display parameters of the one or more media assets associated with the further party, the content stream controller is configured to deliver a modified custom channel to the one or more display device, the modified custom channel comprising the plurality of media assets associated with the content broadcaster, and the one or more further media assets associated with the further party in accordance with the display parameters of the one or more media assets associated with the further party.

According to another aspect there is provided a method of delivering media content from a digital signage system to one or more display devices, the method comprising controlling a display of a terminal associated with a custom channel producer to display media asset options; detecting selection by the custom channel producer of a plurality of media assets based on detecting selection of displayed media asset options corresponding to the plurality of media assets, wherein at least one of the selected media assets is stored in at least one media store external to said digital signage system, each of the at least one media store storing one or more media assets deliverable to a viewing device in response to a selection by a viewer associated with said viewing device; validating display parameters of at least one further media asset stored in at least one media store external to said digital signage system, and selected by the custom channel producer; producing a custom channel comprising the selected media assets including said at least one further media asset in dependence on said display parameters, and delivering said custom channel to the one or more display devices.

In an embodiment, the display parameters for validating said further media asset may be associated with data identifying said at least one further party.

In an embodiment, the display parameters may be derived from a key identifying said further party. For example, information validating and identifying said further party may be hashed with the display parameters to provide a unique key.

In an embodiment, the provision of display parameters may be dependent on validation data comprising registration data validating said further media assets for acceptance by said content stream controller.

In another embodiment, the further media assets may comprise advertising media.

The advertising media may comprise adverts, or may comprise a plurality of syndicated advertisements for example.

The modified custom channel delivered by said custom channel controller to said at least one display device may comprise at least one further media asset pushed by said further media store in dependence on said validation.

The at least one further media asset may be pushed in real-time on-demand to the digital signage system.

In another embodiment, the at least one further media asset may be pushed in real-time to said display device(s) producing said modified channel.

In another embodiment, the pushing of at least one further media asset may occur automatically or on request.

According to yet a further aspect, there is provided a computer program product for delivering media content to one or more display devices, the computer program product being embodied on a non-transient computer-readable medium and configured so as when executed on one or more processors to control a display of a terminal associated with a custom channel producer to display media asset options; detect selection by the custom channel producer of a plurality of media assets based on detecting selection of displayed media asset options corresponding to the plurality of media assets, wherein at least one of the selected media assets is stored in at least one media store external to said digital signage system, each of the at least one media store storing one or more media assets deliverable to a viewing device in response to a selection by a viewer associated with said viewing device; validate display parameters of at least one further media asset stored in at least one media store external to said digital signage system, and selected by the custom channel producer; produce a custom channel comprising the selected media assets including said at least one further media asset in dependence on said display parameters, and deliver said custom channel to the one or more display devices.

BRIEF DESCRIPTION OF THE DRAWINGS

For a better understanding of the present disclosure and to show how the same may be put into effect, reference will now be made, by way of example, to the following drawings in which.

Figure 1:
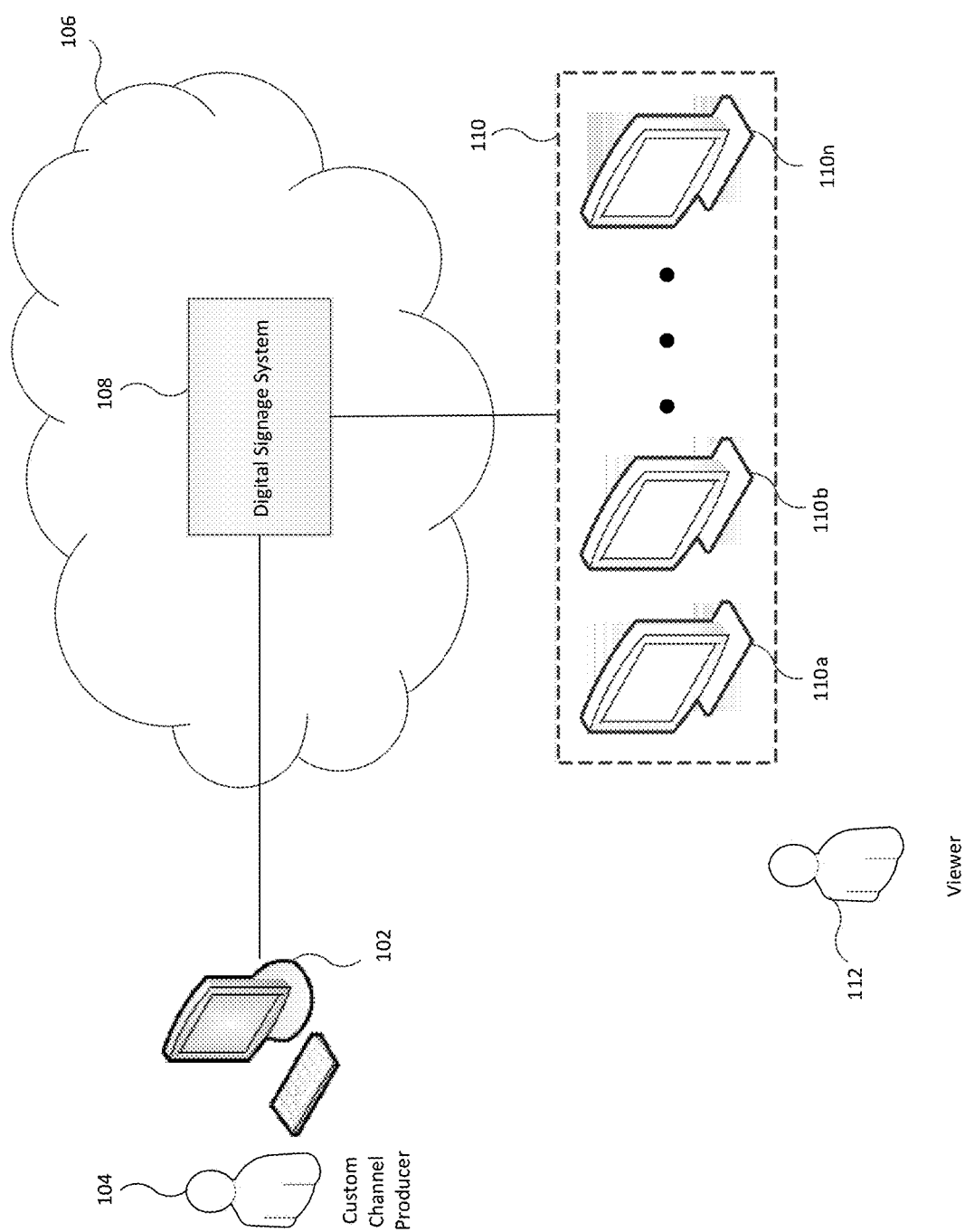
FIG. 1 illustrates a schematic view of a digital signage system.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

FIG. 1 illustrates a digital signage system 108 implemented on network devices in a network 106.

Connected to the network 106 is a terminal 102 associated with a custom channel producer 104. The terminal 102 may be, for example a personal computer ("PC") (including, for example, Windows™, Mac OS™ and Linux™ PCs), a tablet computer, a mobile phone, a personal digital assistant ("PDA"), or other embedded device able to connect to the network 106.

The custom channel producer 104 can upload media assets (from memory on the terminal 102 or from one or more storage devices in the network 106) to storage of the digital signage system 108 for use in the creation of a custom channel for delivery to one or more display device 110. Media assets may comprise videos, static images or a combination thereof; audio information may also accompany displayable information. Reference to a "custom channel" is used herein to refer to a plurality of media assets that have been stitched together in dependence on display parameters selected by the custom channel producer 104.

The network 106 may be any suitable network which has the ability to provide a communication channel between the terminal 102 and the digital signage system 108, and has the ability to deliver a custom channel from the digital signage system 108 to the one or more display device 110. For example, the network 106 may be a packet-based network such as the Internet, an Intranet or a High data rate mobile network, such as a 3rd generation ("3G") mobile network, or a combination of one or more of these network types A display device of the one or more display device 110 may be any device able to receive and display media assets. For example, a display device may be a display panel, television, tablet computer etc. comprising a display e.g. an LCD display, a PDP display, an LED display, an OLED display etc. It will be appreciated that other display technologies are well known to persons skilled in the art and the selection of display technologies referred to herein are merely examples.

The display device(s) 110 may be positioned in an outdoor space for example alongside a highway or in a park; or in an indoor space for example in an airport, supermarket, shopping mall, office building etc. As shown in FIG. 1, a viewer 112 may view the content of the custom channel that is delivered to the display device(s) 110. The viewer 112 has no control on what content is displayed on the display device(s) 110, as described above, the content which is displayed on the display device(s) 110 is controlled by the custom channel producer 104.

Figure 2:
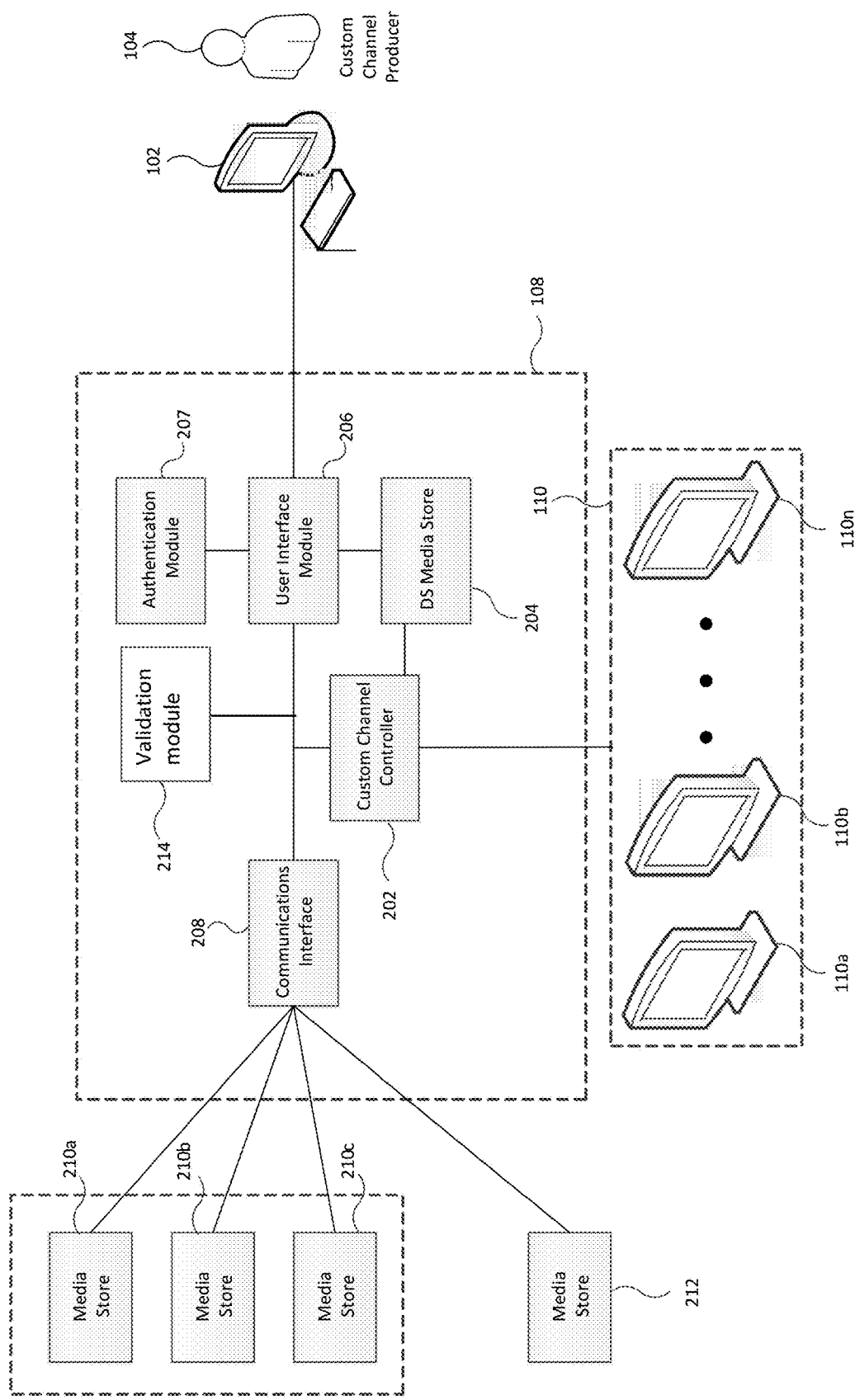
FIG. 2 illustrates a schematic view of elements of the digital signage system.

Reference is now made to FIG. 2 to describe the digital signage system 108 in more detail.

The digital signage system 108 comprises a custom channel controller 202. The custom channel controller 202 is configured to produce the custom channel referred to above and deliver the custom channel over the network 106 to the display device(s) 110. The functionality of the custom channel controller 202 may be implemented in code (software) arranged for execution on one or more processing units of one or more network entities (e.g. servers) in the network 106.

The custom channel controller 202 is coupled to a digital signage media store 204 which is arranged to store digital signage media assets. The digital signage media store 204 may receive digital signage media assets that have been uploaded from memory on the terminal 102 associated with the custom channel producer 104 or transferred from one or more storage devices in the network 106. The digital signage media assets stored in the digital signage media store 204 may be associated with metadata (for example title, duration, category, keywords, author, size, description, date of creation etc.).

The digital signage media store 204 may be implemented on one or more network entities (e.g. storage server(s) or database(s)) in the network 106.

The custom channel producer 104 registers with the provider of the digital signage system 108, as part of this registration process the custom channel producer 104 sets up a digital signage account with access credentials that uniquely identifies the custom channel producer 104 to the provider of the digital signage system 108 amongst other registered custom channel producers. The access credentials may comprise for example an email address, username, password or any combination thereof. Following registration, the custom channel producer 104 can access the digital signage system 108 using his access credentials. For example, the custom channel producer 104 may enter his access credentials (log-in information) into a web browser on the terminal 102 to access the digital signage system 108.

A user interface module 206 of the digital signage system 108 is configured to receive the access credentials over the network 106 from the terminal 102. The user interface module 206 is coupled to an authentication module 207 which is configured to store account information in order to verify (or not) users of the digital signage system 108. The user interface module 206 is configured to query the authentication module 207 using the access credentials entered by the custom channel producer 104.

Once the access credentials of the custom channel producer 104 have been verified by the authentication module 207, the user interface module 206 is configured to provide the custom channel producer 104 access to the digital signage system 108.

The user interface module 206 is coupled to the digital signage media store 204. Once the access credentials of the custom channel producer 104 have been verified by the authentication module 207, the user interface module 206 is configured to transmit data to the terminal 102 to control the display of the terminal 102 to display selectable media asset options in a user interface which may be selected by the custom channel producer 104 when configuring the custom channel. A selectable media asset option may be displayed together with metadata associated with the media asset corresponding to the selectable media asset option.

In response to the custom channel producer 104 selecting a plurality of media asset options, the terminal 102 associated with the custom channel producer 104 transmits data over the network 106 to the user interface module 206 indicating the plurality of media asset options selected by the custom channel producer 104. In response to receiving this data from the terminal 102, the user interface module 206 is configured to detect selection of a plurality of media assets based on detecting selection of the media asset options corresponding to the media assets. The user interface module 206 is coupled to the custom channel controller 202 and is further configured to supply an indication of the selected media assets to the custom channel controller 202.

Using the user interface displayed on the terminal 102 associated with the custom channel producer 104, the custom channel producer 104 can configure a custom channel to be delivered on the display device(s) 110 by selecting display parameters. For example, the custom channel producer 104 can specify an order (i.e. sequence) in which the selected plurality of media assets are to be displayed in the custom channel. The custom channel producer 104 may also specify the duration for which one or more of the plurality of media assets should be displayed. Rather than specifying an order in which the selected plurality of media assets are to be displayed in the custom channel, the custom channel producer 104 may merely select the display frequency (how often a media asset is displayed in a predetermined period of time) of one or more of the selected plurality of media assets. These configurable options are transmitted from the terminal 102 to the user interface module 206 as display parameters. The user interface module 206 is configured to supply the received display parameters to the custom channel controller 202.

The functionality of the user interface module 206 may be implemented in code (software) arranged for execution on one or more processing units of one or more network entities (e.g. servers) in the network 106.

A communications interface 208 is coupled to the user interface module 206. The communications interface 208 acts as a gateway through which media assets (additional to the digital signage assets stored in the digital signage media store 204) may be pulled and used in a custom channel.

The communications interface 208 is connectable to media stores external to the digital signage system 108 which are components of OVP platforms provided by providers other than the provider of the digital signage system 108. These media stores are shown in FIG. 2 as media stores 210a, 210b and 210c. Whilst FIG. 2 shows three media stores 210 which are components of separate OVP platforms provided by providers other than the provider of the digital signage system 108, this is merely an example and the communications interface 208 may be connectable to any number of media stores which are components of OVP platforms provided by providers other than the provider of the digital signage system 108.

The communications interface 208 is also connectable to a media store 212 external to the digital signage system 108 which is a component of an OVP platform provided by the same provider of the digital signage system 108.

The functionality of the communications interface 208 may be implemented in code (software) arranged for execution on one or more processing units of one or more network entities (e.g. servers) in the network 106. For example the communications interface 208 may comprise application programming interfaces (APIs), wherein each API is used to communicate with a respective OVP platform.

Also provided, in this embodiment, is a validation module 214 configured to receive display parameters for the display 102, 110a, of the one or more media assets and further media assets 312 associated with at least one further party. The further party may be an advertiser, or an agent of an advertiser with access to media content. The further party may not have a formal relationship with the digital signage system provider, or the custom channel producer. However, the validation module allows for insertion or "pull" of media assets for inclusion in a channel from sources 312 not so authenticated.

The validation module 214 may supply display parameters to the content stream controller in response to validating acceptance of said display parameters by the content broadcaster.

In an embodiment, the validation module may provide validating data associated with said display parameters and said at least one further party, the data comprising a key identifying said further party. The key may be encrypted, and perform typical hashing to validate that the further media content can be accessed through the digital signage system.

In another embodiment, the validation data may comprise registration data validating the further media assets for acceptance by the content stream controller.

In an embodiment, the further party may be an advertiser and the further media assets may comprise advertising media.

The validation module may, in some embodiments connect to the authentication module storing account information of registered custom channel producers, wherein the user interface module is configured to control the display of the terminal associated with the custom channel producer to display said media asset options, in response to verifying the custom channel producer as having an account associated with the digital signage system by querying the authentication module with access credentials received from the terminal associated with the custom channel producer.

In an embodiment, the authentication module may receive validation data from the validation module.

Hence a media asset may be authenticated and validated to improve security.

Figure 3:
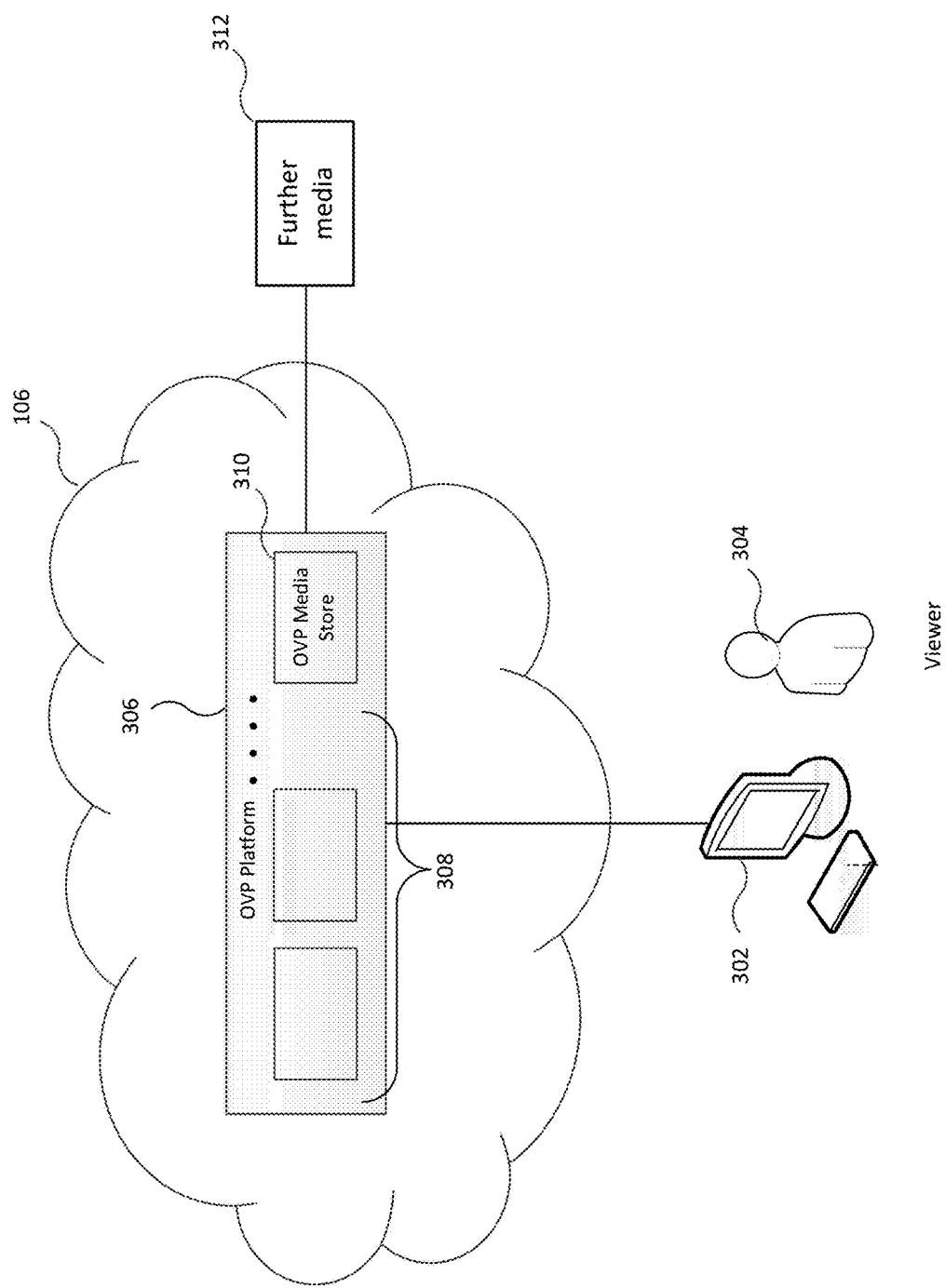
FIG. 3 illustrates an online video platform.

FIG. 3 illustrates an online video platform 306 implemented on network devices in the network 106.

The platform 306 is provided with access to a further media store 312 external to the platform, but nevertheless accessible via the validation module 214 to users of the platform as described previously.

In addition to having registered a digital signage account with the provider of the digital signage system 108, the custom channel producer 104 may also register with a provider of the online video platform 306.

The platform 306 may also be provided access to a further media store 312 external to the platform, but nevertheless accessible via the validation module 214 to users of the platform.

As part of this registration process the custom channel producer 104 sets up an OVP account with access credentials that uniquely identifies the custom channel producer 104 to the provider of the OVP platform 306 amongst other registered users of the OVP platform 306. The access credentials may comprise for example an email address, username, password or any combination thereof. Following registration, the custom channel producer 104 can access the OVP platform 306 using his OVP account access credentials. For example, the custom channel producer 104 may enter his access credentials (log-in information) into a web browser on the terminal 102 to access the OVP platform 306.

As a registered user of the OVP platform 306, the custom channel producer 104 can upload media assets (from memory on the terminal 102 or from one or more storage devices in the network 106) to an OVP media store 310 of the OVP platform 306. The OVP media assets stored in the OVP media store 310 may be associated with metadata (for example title, duration, category, keywords, author, size, description, date of creation etc.). The OVP media store 310 may be implemented on one or more network entities (e.g. storage server(s) or database(s)) in the network 106.

In the scenario where the provider of the OVP platform 306 is different to the provider of the digital signage system 108, the OVP media store 310 corresponds to one of the media stores 210a-c. In the scenario where the provider of the OVP platform 306 is the same as the provider of the digital signage system 108, the OVP media store 310 corresponds to the media store 212.

The OVP platform 306 enables the custom channel producer 104 as a registered user of the OVP platform 306 to distribute media assets for example on their own website, video-sharing sites such as YouTube, partner websites and on social media websites. That is, the media assets in the OVP media store 310 are arranged to be delivered by the OVP platform 306 to a viewing device 302 associated with a viewer 304 in response to being selected to be viewed by the viewer 304 (for example the viewer 304 selecting to play the media asset using a player embedded in a website). This is in contrast to the viewer 112 of the digital signage display device(s) 110 who has no control on what content is displayed on the display device(s) 110. The viewing device 302 may be, for example a personal computer ("PC") (including, for example, Windows™, Mac OS™ and Linux™ PCs), a tablet computer, a mobile phone, a personal digital assistant ("PDA"), or other embedded device able to connect to the network 106. Whilst only one viewing device 302 is shown connected to the OVP platform 306 for simplicity, it will be appreciated that OVP assets hosted by the OVP platform 306 can be delivered to multiple different viewing devices.

In addition to the media store 310, the OVP platform comprises a plurality of other functional components represented by reference numeral 308. These other functional components may comprise for example an encoding module, transcoding module, content management module, analytics module, and a validation module 214.

Using the user interface provided by the user interface module 206 of the digital signage system 108, the custom channel producer 104 can associate (i.e. link) his digital signage account with his OVP account access credentials used to access the OVP platform 306. The authentication module 207 is configured to store OVP account access credentials that are associated with a digital signage account.

A flow chart 400 of a method implemented by the digital signage system 108 to enable the custom channel producer 104 to create a custom channel from other sources of media assets other than the digital signage media store 204 and including those media assets of a third party will now be described with reference to FIG. 4.

At step S402, the user interface module 206 receives over the network 106 digital signage access credentials from the terminal 102 which have been provided by the custom channel producer 104.

The user interface module 206 queries the authentication module 207 using the digital signage access credentials to verify the custom channel producer 104 as a user of the digital signage system 108, and due to the custom channel producer 104 having associated his digital signage account with his OVP account access credentials used to access the OVP platform 306, the user interface module 206 determines at step S404 the OVP account access credentials of the custom channel producer 104.

At step S406, the user interface module 206 determines using the digital signage access credentials of the custom channel producer 104 what digital signage media assets (uploaded by the custom channel producer 104) are stored in the digital signage media store 204 i.e. what digital signage media assets are available for use by the custom channel producer 104 in the creation of a custom channel.

At step S408, the user interface module 206 supplies the OVP account access credentials of the custom channel producer 104 to the communications interface 208. The communications interface 208 uses the OVP account access credentials to connect to the OVP platform 306. Once connected to the OVP platform 306, the user interface module 206 determines using the OVP account access credentials of the custom channel producer 104 what OVP media assets (uploaded by the custom channel producer 104) are stored in the OVP media store 310.

At step S410, user interface module 206 transmits data to the terminal 102 associated with the custom channel producer 104 to display selectable media asset options on the terminal 102 in a user interface. The selectable media asset options correspond to the digital signage media assets stored in the digital signage media store 204 and the OVP media assets stored in the OVP media store 310.

Figure 4:
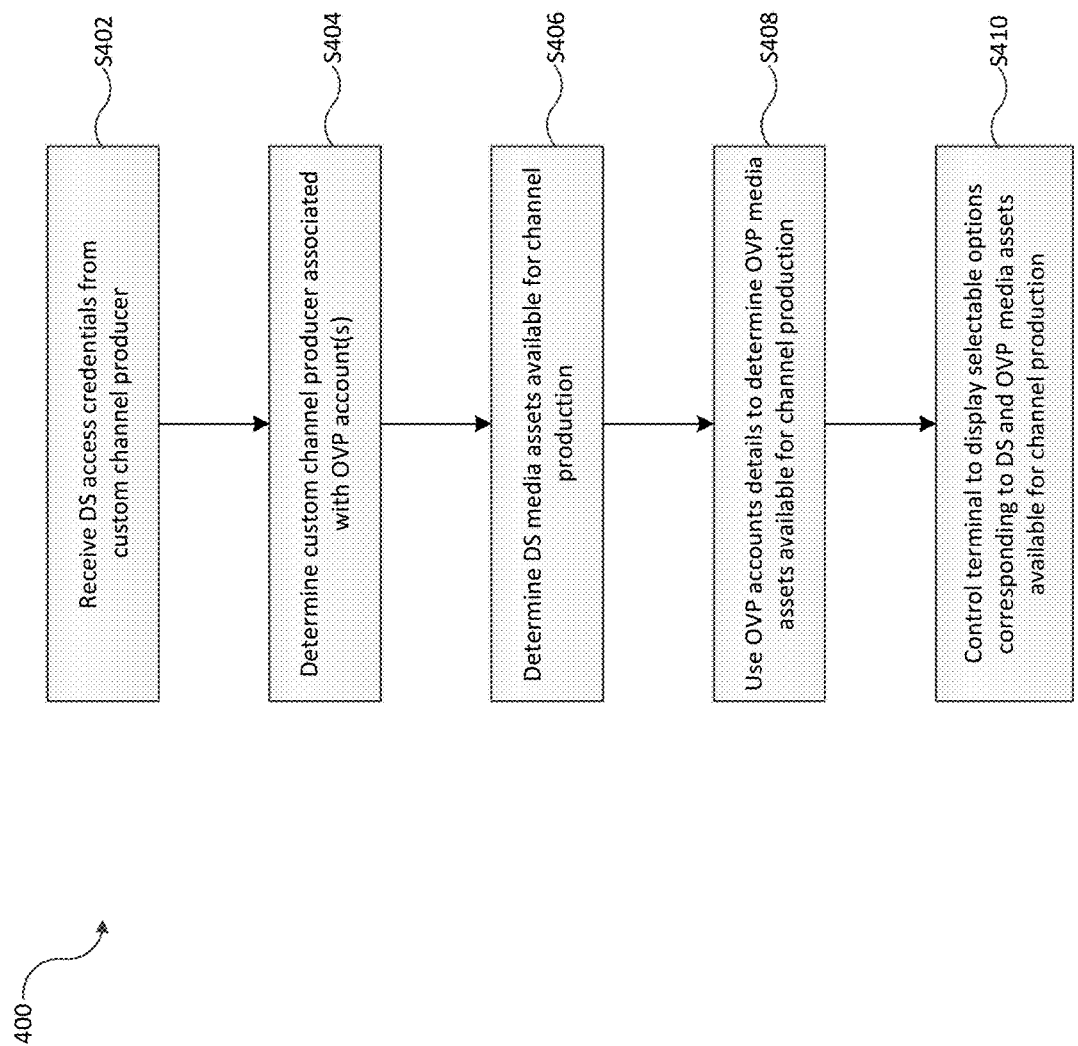
FIG. 4 is a flow chart for a method to enable a custom channel producer to create a custom channel.

Following the digital signage system 108 implementing the method illustrated in FIG. 4, the custom channel producer 104 selects a plurality of the displayed media asset options.

A flow chart 500 of a method implemented by the digital signage system 108 to deliver a custom channel to display device(s) 110 will now be described with reference to FIG. 5 in the scenario that the media asset options selected by the custom channel producer 104 corresponds to an OVP media asset stored in the OVP media store 310, and at least one further media asset of a further party.

Data indicating the plurality of media asset options selected by the custom channel producer 104 is transmitted over the network 106 from the terminal 102 and is received by the user interface module 206.

At step S502, using the received data indicating the plurality of media asset options including the media assets of at least one further party 312 are selected by the custom channel producer 104. The user interface module 206 subsequently detects selection of a plurality of media assets corresponding to the selected media asset options. The user interface module 206 then may supply an indication of the selected media assets to the custom channel controller 202.

At step S504, the user interface module 206 receives display parameters over the network from the terminal 102. The display parameters (selected by the custom channel producer 104) define how a custom channel should be produced by the custom channel controller 202, and further relate, via the validation module, to media assets of a further party selected for inclusion in the custom channel.

At step S506, the custom channel controller 202 produces a custom channel in dependence on the received display parameters, including at least one further media asset from a further party such as an advertiser, or a you-tube host or such like.

Step S506 comprises the custom channel controller 202 pulling media assets from their storage location at times governed by the received display parameters. For example if the plurality of selected media assets comprise a digital signage media asset stored in digital signage media store 204, the custom channel controller 202 will pull the digital signage media asset from the digital signage media store 204 at the appropriate time (dependent on the received display parameters). The further media assets may be provided in real time ("pushed") once validated for inclusion in the channel. When the custom channel controller 202 determines, based on the received display parameters that it is time to pull an OVP media asset stored in the OVP media store 310, the custom channel controller 202 transmits a request via the communications interface 208 for the OVP media asset. In response to receiving this request the OVP platform 306 supplies the OVP media asset from the OVP media store 310 via the communications interface 208 to the custom channel controller 202.

At step S510, the custom channel controller 202 delivers the custom channel over the network 106 to the display device(s) 110.

The digital signage system 108 is able to deliver an OVP media asset pulled from the OVP media store 310 and media assets pulled or pushed from the further media store 312 in a custom channel to the display device(s) 110 without having to store the media asset(s) in storage of the digital signage system 108. That is, the digital signage system 108 merely facilitates the delivery of the media asset(s) in the custom channel to the display device(s) 110. This advantageously provides the ability for the custom channel producer 104 to search for, and produce a custom channel using content from other sources of media (other than digital signage assets stored in the digital signage media store 204) without having to transfer this other media into storage of the digital signage system 108.

The custom channel producer 104 can associate (i.e. link) his digital signage account with multiple OVP account access credentials used to access respective OVP platforms. In accordance with the embodiments described above, this enables the custom channel producer 104 to search for, and produce a custom channel using OVP media assets stored by multiple OVP platforms.

The custom channel producer 104 may associate (i.e. link) his digital signage account with multiple further media stores not being part of the general OVP platform and account, via the validation module by producing for example a key.

In accordance with the embodiments described above, this enables the custom channel producer 104 to search for, and produce a custom channel using OVP media assets stored by multiple OVP platforms, and further media assets not stored in or related to the OVP platform itself.

It will be appreciated that a custom channel delivered to the display device(s) 110 may comprise both media assets pulled from the digital signage media store 204 and media assets pulled from one or more further media stores 312, in dependence on validation 214.

Whilst both digital signage media assets and OVP media assets may be displayed to the custom channel producer 104 on the terminal 102 following step S410, the plurality of selected media asset options may correspond only to OVP media assets.

In this scenario, the custom channel delivered to the display device(s) 110 may comprise only OVP media assets pulled from one or more OVP media store.

The digital signage media store 204 may not store any digital signage media assets associated with the custom channel producer 104. In this scenario, only OVP media assets may be displayed to the custom channel producer 104 on the terminal 102, wherein the OVP media assets are associated with an OVP account associated with the custom channel producer's digital signage account. This may be the case if a customer of an OVP platform registers with the provider of the digital signage system 108 (and therefore becomes a registered custom channel producer of the digital signage system 108) in order to widen the audience of the OVP customer's OVP media assets.

In an embodiment, the at least one further media asset may be pushed in real-time to said display device(s) as part of the displayed modified channel. The pushing for inclusion, after validation of said further media asset, may be upon request of the custom channel producer, or may occur automatically to provide a modified channel being displayed to the customer.

Hence, a custom channel producer may have access to further media assets either by selection after validation, or may include options in the custom channel to request such further media assets when required. Hence, a more flexible professional digital signage system is enabled, where syndicated and validated further media content may be provided automatically in a custom channel, even so that the owner or provider of the further media assets is not directly linked with said digital signage system or OVP platform.

Whilst it has been described above that in embodiments of the present disclosure an OVP asset can be pulled from the OVP media store 310 and delivered in a custom channel to the display device(s) 110 without having to store the OVP asset in storage of the digital signage system 108, the digital signage system 108 does have the ability to store the retrieved OVP media assets, for example in the digital signage media asset store 204 or other media store of the digital signage system 108. The digital signage system 108 may be configured to automatically store retrieved OVP media assets. Alternatively, the digital signage system 108 may only store retrieved OVP media assets based on this being configured by the custom channel producer 104.

Figure 5:
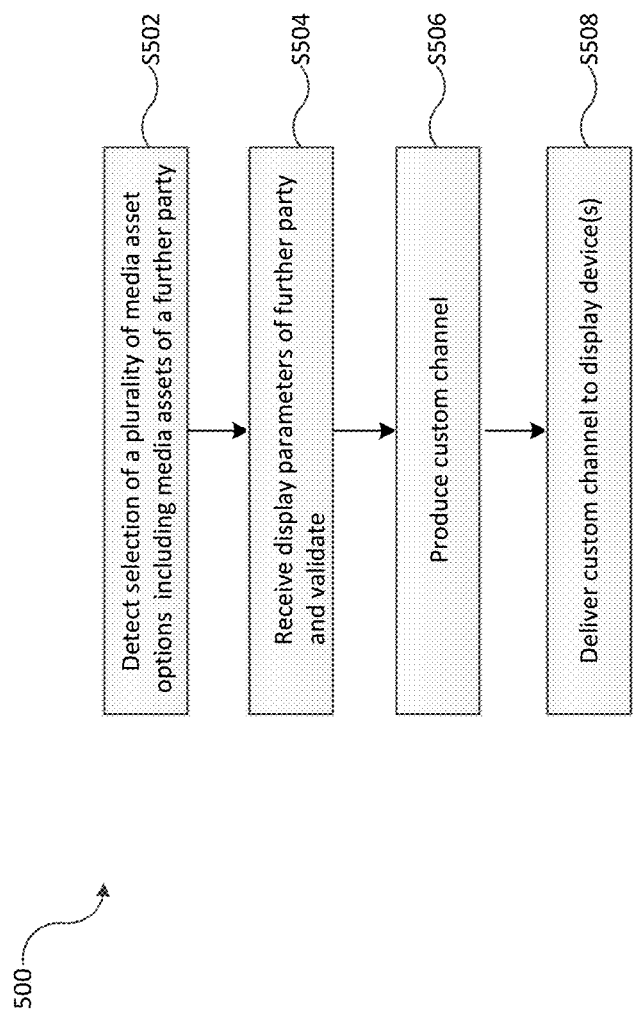
FIG. 5 is a flow chart for a method according to an embodiment.

The steps shown separately in FIGS. 4 and 5 may or may not be implemented as separate steps. Furthermore the present disclosure is not limited to the steps of FIGS. 4 and 5 being implemented in the order shown.

Any of the functionality described herein can be implemented using software, firmware, hardware (e.g., fixed logic circuitry), or a combination of these implementations. The terms "module", "functionality", "interface" and "component" as used herein generally represent software, firmware, hardware, or a combination thereof. In the case of a software implementation, the module, functionality, interface or component represents program code that performs specified tasks when executed on a processor (not shown in the Figures). The program code can be stored in one or more computer readable memory devices.

It will be appreciated that the above embodiments have been described only by way of example, and other variants or applications may be apparent to a person skilled in the art given the disclosure herein.

The present invention is not limited by the described examples but only by the attached claims. Any reference signs in the claims should not be construed as limiting the scope.

While this invention has been particularly shown and described with references to example embodiments thereof, it will be understood by those skilled in the art that various changes in form and details may be made therein without departing from the scope of the invention encompassed by the appended claims.

What is claimed is:

1. A digital signage system comprising:
a communications interface configured to receive one or more external media assets of at least one further party from at least one external media store to said digital signage system;
an internal media store storing a plurality of internal media assets associated with a content broadcaster;
wherein said internal media assets are different to the external media assets, and wherein said external media assets are not stored in the internal media store,
an authentication module storing account information of registered custom channel producers and configured to:
(i) verify, using first access credentials between the custom channel producer and the digital signage system, a custom channel producer as having an account associated with the digital signage system by querying in a first authentication operation, the authentication module with the first access credentials received from a terminal associated with the custom channel producer, wherein following a successful first authentication operation the custom channel producer can access the internal media assets and the digital signage system; and
(ii) access the external media store via the communication interface using second access credentials between the custom channel producer and the external media store, in response to querying, in a second authentication operation, the authentication module with the second access credentials received from the terminal associated with the custom channel producer, wherein following a successful second authentication operation the custom channel producer can access the external media assets via the digital signage system;
a user interface module configured to:
(i) control a custom channel producer display device, being a display of a terminal associated with the custom channel producer, to display media asset options comprising at least one internal media asset and at least one external media asset;
(ii) detect selection by the custom channel producer of at least one of the displayed media asset option;
(iii) receive display parameters selected by the custom channel producer and associated with the at least one selected media asset options, the display parameters defining at least one of the display order, the display duration and the display frequency for the selected media asset options; and
a content stream controller coupled to the communications interface, media asset store and at least one digital signage display device;
a validation module configured to receive display parameters for the display of the at least one media asset and the at least one further media asset, and supply said display parameters to the content stream controller in response to validating acceptance of said display parameters by the content broadcaster;
wherein in response to receiving display parameters of the one or more media assets associated with the further party, the content stream controller is configured to deliver a custom channel for display on the at least one digital signage display device, the custom channel comprising the at least one internal media asset associated with the content broadcaster retrieved by the digital signage system from the internal media store based on the first authentication between the custom channel producer and the digital signage system, and the at least one external media asset associated with the further party, obtained by the digital signage system from the external media store, based on the second authentication between the custom channel producer and the external media store via the digital signage system, in accordance with the display parameters received from the custom channel producer, the content which is displayed on the at least one digital signage display device being controlled by the custom channel producer, a viewer of the at least one digital signage second display device having no control on what content is displayed on the at least one second display device.

2. A digital signage system according to claim 1, wherein the validation module provides validating data associated with said display parameters and said at least one further party.

3. A digital signage system according to claim 2, wherein the validating data comprises a key identifying said further party.

4. A digital signage system according to claim 2, wherein the validating data comprises registration data validating said one or more media assets for acceptance by said content stream controller.

5. A digital signage system according to claim 1, wherein the one or more further media assets comprise advertising media.

6. A digital signage system according to claim 1, wherein the authentication module is configured to receive validation data from said validation module.

7. A digital signage system according to claim 1, wherein the custom channel delivered by said custom channel controller to said at least one display device comprises at least one external media asset pushed by said external digital signage media store in dependence on said validation.

8. A digital signage system according to claim 7, wherein the pushing of said external media asset comprises automatic insertion into said custom channel to produce said custom channel for said custom channel controller.

9. A digital signage system according to claim 7, wherein the pushing occurs in response to a request from said custom channel producer.

10. A digital signage system according to claim 7, wherein the pushing occurs automatically.

11. A method of delivering media content from a digital signage system, the method comprising:
receiving one or more external media assets of at least one further party from at least one external media store external to said digital signage system wherein said internal media assets are different to the external media assets, and wherein said external media assets are not stored in the internal media store;
storing a plurality of internal media assets associated with a content broadcaster in an internal media assets store;
verifying, using first access credentials between the custom channel producer and the digital signage system a custom channel producer as having an account associated with the digital signage system by querying, in a first authentication operator, the authentication module with the first access credentials received from a terminal associated with the custom channel producer, wherein following a successful first authentication operation the custom channel producer can access the internal media assets and the digital signage system; and
accessing the external media store via the communication interface, using second access credentials between the custom channel producer and the external media store, in response to querying in a second authentication operation the authentication module with the second access credentials received from the terminal associated with the custom channel producer, wherein following a successful second authentication operation the custom channel producer can access the external media assets via the digital signage system;
controlling a custom channel producer first display device, being a display of the terminal associated with the custom channel producer, to display media asset options comprising at least one internal media asset and at least one external further media asset;
detecting selection by the custom channel producer of at least one of the displayed media asset options;
receiving display parameters selected by the custom channel producer and associated with the at least one selected media asset option, the display parameters defining at least one of the display order, the display duration and the display frequency for the selected media asset options;
validating said display parameters;
delivering a custom channel for display on at least one digital signage second display device, the custom channel comprising the at least one internal media asset associated with the content broadcaster retrieved by the digital signage system from the internal media store based on an authentication between the custom channel producer and the digital signage system, and the at least one external media asset associated with the further party, obtained by the digital signage system from the external media store, based on an authentication between the custom channel producer and the external media store via the digital signage system in accordance with the display parameters received from the custom channel producer; and
controlling the content which is displayed on the at least one digital signage display device by the custom channel producer, a viewer of the at least one digital signage display device having no control on what content is displayed on the at least one digital signage display device.

12. A method according to claim 11, wherein the display parameters for validating said eternal media asset are associated with data identifying said at least one further party.

13. A method according to claim 11, wherein the display parameters are derived from a key identifying said further party.

14. A method according to claim 11, wherein the provision of display parameters is dependent on validation data comprising registration data validating said further media assets for acceptance by said content stream controller.

15. A method according to claim 11, wherein the further media assets comprise advertising media.

16. A method according to claim 11, wherein the custom channel delivered by said custom channel controller to said at least one second display device comprises at least one external media asset pushed by said external media store in dependence on said validation.

17. A digital signage system according to claim 11, wherein the pushing occurs automatically or on request.

18. A computer program product for delivering media content, the computer program product being embodied on a non-transitory computer-readable medium and configured so as when executed on one or more processors to:
receive one or more external media assets of at least one further party from at least one external media store external to said digital signage system wherein said internal media assets are different to the external media assets, and wherein said external media assets are not stored in the internal media store,
store a plurality of internal media assets associated with a content broadcaster in an internal media asset store;
verify using first access credentials a custom channel producer as having an account associated with the digital signage system by querying, in a first authentication operation, the authentication module with the first access credentials received from a terminal associated with the custom channel producer wherein following a successful first authentication operation the custom channel producer can access the internal media assets and the digital signage system; and
determine second access credentials associated with said custom channel producer account in response to querying the authentication module with the access credentials received from the terminal associated with the custom channel producer, and the communications interface being configured to connect to the at least one further media store external to said digital signage system using said second access credentials associated with said custom channel producer account in a second authentication operation;

control a custom channel producer display device, being a display of the terminal associated with the custom channel producer to display media asset options comprising at least one internal media asset and at least one external media asset;

detect selection by the custom channel producer of a plurality of the displayed media asset options;

receive display parameters selected by the custom channel producer and associated with the selected media asset options, the display parameters defining at least one of the display order, the display duration and the display frequency for the selected media asset options;

validate said display parameters;

deliver a custom channel for display on at least one digital signage display device, the custom channel comprising the at least one internal media asset associated with the content broadcaster, and the at least one external media asset associated with the further party in accordance with the display parameters received from the custom channel producer; and control the content which is displayed on the at least one digital signage display device by the custom channel producer, a viewer of the at least one digital signage display device having no control on what content is displayed on the at least one digital signage display device.

* * * * *